Nov. 29, 1966 A. J. BARACKET 3,288,920
SYNCHRONIZING SIGNAL GENERATOR FOR MULTI-MODE OPERATION
Filed Sept. 5, 1962
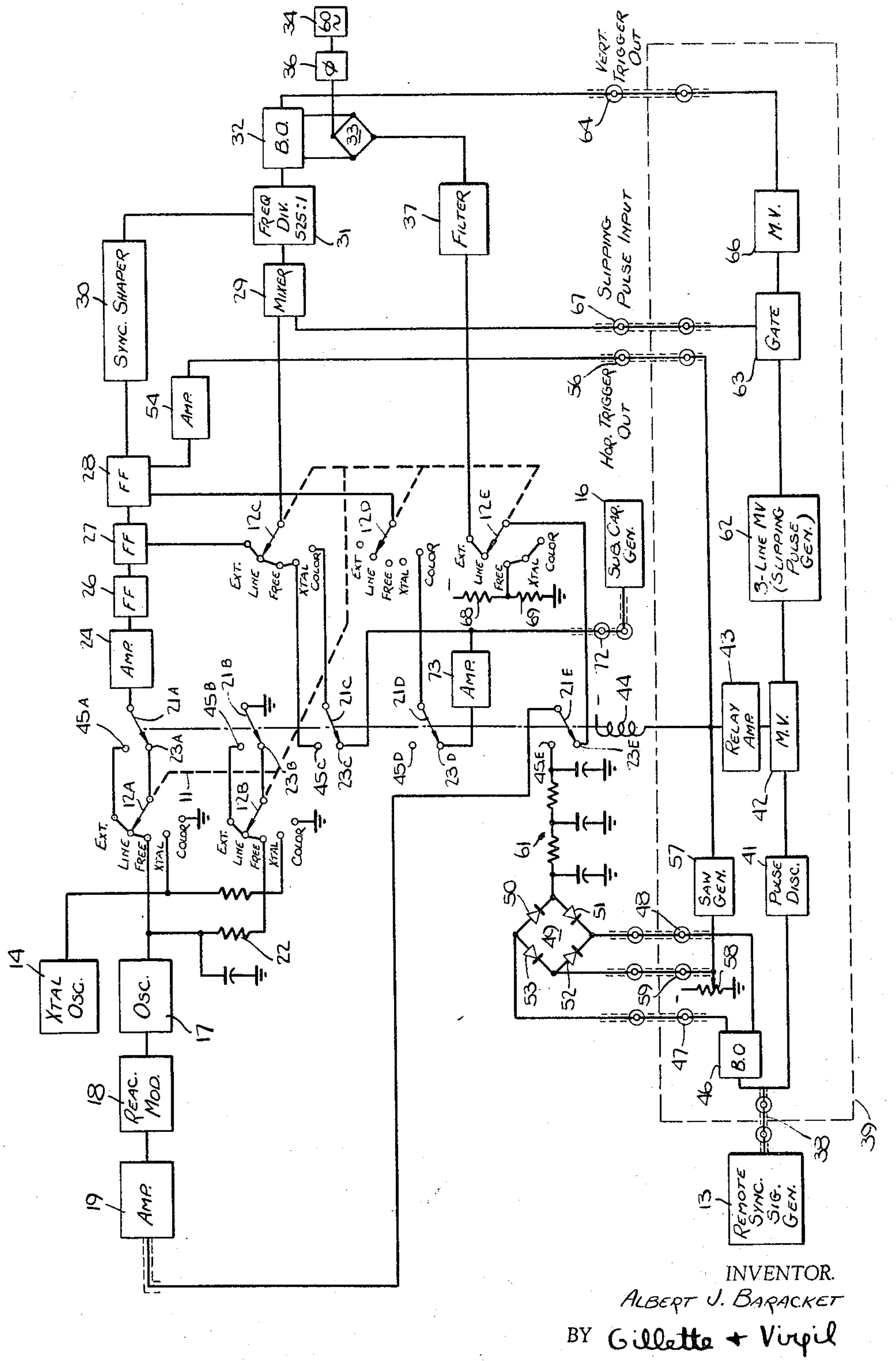
INVENTOR.
ALBERT J. BARACKET
BY Gillette + Virgil
ATTORNEYS United States Patent Office 3,288,920
Patented Nov. 29, 1966

3,288,920
SYNCHRONIZING SIGNAL GENERATOR FOR MULTI-MODE OPERATION

Albert J. Baracket, Cedar Grove, N.J., assignor to Diamond Power Specialty Corporation, Lancaster, Ohio, a corporation of Ohio
Filed Sept. 5, 1962, Ser. No. 221,461
3 Claims. (Cl. 178—5.4)

This invention relates to television synchronizing signal generators and particularly to an improvement permitting the generator to be operated in any one of several modes, that is, under the control of any one of several frequency reference sources and to be switched immediately and automatically from operation in one of such modes to operation in another in the event that there is an interruption in the signal controlling the first mode.

In accordance with this invention a synchronizing signal generator which may include frequency divider circuits as set forth in my copending application entitled Frequency Divider Circuit is provided with a switch which may be manually operated for setting the generator so that its basic frequency is determined by an internally generated signal or by a remote synchronizing signal generator, but, in the latter case, with the proviso that if the signal from the remote generator is interrupted or removed, operation of the main generator will automatically return to control by the internally generated signal in accordance with a preset switch. Conversely, the main synchronizing signal generator is automatically switched to be controlled by the remotely generated signal when the latter is present. Control of the mode of operation is determined in the first instance by a multi-pole switch but this switch is connected to a relay which can override the switch and cause the generator to be operated in an alternate mode.

The invention will be described in greater detail in the following specification together with the drawing in which the only figure is a block schematic diagram of a television synchronizing signal generation system including the invention.

In the drawing the mode of operation of the generator is basically determined by a switch 11 consisting of five arms 12A–12E each settable to five different positions labeled "Ext, or External," "Line," "Free," "Xtal, or Crystal," and "Color" and denoting the different modes of operation of the generator. Briefly these modes may be defined in the following way: "External" means that the basic frequency in which the generator operates is determined by an external, or remote, synchronizing signal generator, such as generator 13; "Line" means that the basic control is derived from the 60 cycle power line to which the generator is connected for operation; "Free" means that the generator is not closely controlled but operates as it will in accordance with the internal frequency determining components; "Xtal" means that the frequency is determined by an internal crystal oscillator 14; and "Color" means that the generator is controlled by an outside sub-carrier generator 16, such as the type described in my copending application entitled Sub-Carrier Generator, now Patent 3,170,036. The positions of the arms 12A–12E are such as to indicate that the generator is being controlled by a signal from the 60 cycle power line.

In the Line mode of operation, the signal that actuates the various counting circuits is produced by an oscillator 17 which is free-running oscillator, the frequency of which is controlled by reactance modulator 18. The reactance modulator in turn derives its controlling signal, which is basically a direct voltage of a certain magnitude, from an amplifier 19. This amplifier is connected through a shielded cable to one of the movable poles 21E of a multi-pole double-throw relay which will be described in greater detail hereinafter.

The output signal of the oscillator 17 is impressed across a resistor 22, the lower end of which is connected directly to the Free, Line, and External terminals of layer B of the switch 11. The arm 12B of this layer of the switch is connected to one of the contacts 23B which cooperates with the movable pole 21B of the relay to connect the arm 12B to ground. The upper end of the resistor 22 is connected to the External, Line, and Free terminals of layer A of the switch, the arm 12A of which is connected to contact 23A of the relay and, through the movable pole 21A, to an amplifier 24. The amplifier in turn is connected to a first flip-flop, or binary, circuit, or bistable circuit, 26 for the purpose of reducing the repetition rate of the signal generated by oscillator 17 to one half of its original value.

The output of flip-flop 26 is connected to a second flip-flop 27 which has two output circuits, one going to a third flip-flop 28 and the other going to the External, Line, Free, and Xtal contacts of layer C of the switch. Arm 12C of the switch connects one of these contacts to one input of a mixer circuit 29. The repetition rate of the signal at this point is 31.5 kilocycles per second, which is commonly abbreviated as 31.5 kc. and this signal is one of the signals connected to a synchronizing signal shaper circuit 30, which is a unit that takes impulses timed to have certain repetition rates and utilizes them to control other circuits to produce a standard synchronizing signal.

The output of the mixer circuit 29 is also applied to a frequency divider circuit 31, such as the type described in my copending application referred to above, which divides the incoming frequency in the ratio of 525:1 so that the output signal of the frequency divider has a repetition rate of 60 cycles per second. This output signal is applied to a blocking oscillator 32 to control the operation thereof i.e., to trigger the blocking oscillator into momentary conductivity 60 times per second. The output signal of the blocking oscillator consists of short sharp pulses which are connected to a four-diode clamping circuit 33. The clamping circuit is thus rendered conductive for very short intervals of time at a repetition rate determined by the blocking oscillator frequency. A 60 cycle signal from a source 34, such as the local power line, is applied by way of a phase shifter 36 to the clamping circuit 33, and each time the clamping circuit 33 is rendered conductive for a brief interval the instantaneous amplitude of the 60 cycle signal, which usually has a sinusoidal waveform, is transmitted to a filter 37 which is capable of filtering out high frequency components above 60 cycles and leaving a substantially pure direct voltage. The output signal is connected to the External and Line terminals of layer E of the switch 11 and is connected by way of the arm 12E to contact 23E of the relay.

This completes the frequency controlling loop to provide the direct current signal which is transmitted through the arm 21E to the amplifier 19 to control the reactance of the modulator 18 and thus the frequency of oscillator 17 in accordance with the magnitude of the voltage derived from the filter 37. If the frequency of this oscillator starts to get higher or lower, it will cause the frequency of the blocking oscillator 32 to become higher or lower and this will result in having the clamping circuit 33 become conductive when the instantaneous 60 cycle signal from the phase shifter 36 is at a different point of its cycle. This means that the filter 37 will be supplied with pulses that have either greater or less amplitude than when the blocking oscillator 32 is operating at a correct frequency and therefore, the filtered signal at an output of filter 37 will be either more or less positive than it was previously. This is connected by way of the amplifier 19 to the modulator 18 to cause it to shift the frequency of the oscillator 17 sufficiently to bring the frequency of operation of the oscillator 32 back to a point where it is exactly in step with the 60 cycle signal from source 34.

As may be seen, the sqnchronizing signal generator operates in the same way when the arms 12A–12E are set to the External position, that is the frequency of oscillator 17 continues to govern the operation of the circuit and continues to be governed in turn by the 60 cycle signal from source 34. As a result the switch 11 may be adjusted to the external position without effecting the operation at all. However, when the remote synchronizing signal generator 13 is actually connected through to the main synchronizing signal generator, the operation automatically switches over to be controlled by the remote generator 13. The latter is connected by means of a link indicated by reference character 38. As shown this link may be only a short piece of cable, in practice, it may include a radio circuit or quite an extended length of cable and it may also include additional equipment such as synchronizing signal strippers that separate the synchronizing signal portion from a complete television signal. When the remote generator is turned on, it supplies a synchronizing signal to a control circuit 39 of the type described in my copending application Serial No. 221,463, entitled Synchronizing Signal Generator Control Circuits. The incoming synchronizing signal goes through a pulse discriminator 41, which is actuated by the equalizing pulses and which controls a multivibrator 42. This multivibrator has two outputs one of which energizes a relay amplified 43 to cause a relay 44 to conduct and thus to throw the movable arms 21A–21E to their alternative contacts 45A–45E; i.e., to the upper positions as shown in the drawing.

With the arms 12A–12E on the Line terminals movement of the arms 21A–21E has no effect on any of the levels of the switch 11 except the E level. The signal present at the contact 45E is derived in the following manner: the synchronizing signal from the generator 13 in addition to being supplied to the pulse discriminator 41 is also supplied to a blocking oscillator 46 to cause the latter to conduct at a rate of 15,750 times per second which is the line repetition rate of a commercial television system. The output of this blocking oscillator is connected through terminals 47 and 48 to a four-diode clamping circuit 49 comprising diodes 50–53. This clamping circuit may be identical to the clamping circuit 33. Instead of being supplied with a 60 cycle signal as was the clamping circuit 33, the clamping circuit 49 is supplied with a 15,750 cycle signal derived from flip-flop 28, which supplies a pulse signal to an amplifier 54 and, by way of the horizontal trigger output terminal 56, to a sawtooth generator 57 in the control circuit 39. The output signal of the sawtooth generator 57 is connected to the arm of a potentiometer 58 which is connected in turn to a source of direct voltage so that a direct voltage component is added to the sawtooth wave. The sawtooth-plus-direct voltage signal is fed through a terminal 59 to the clamping circuit 49. As in the case of the clamping circuit 33 the instantaneous voltage level of the arm of the potentiometer 58 is transmitted through a clamping circuit 49 to a filter 61, which need only be designed to filter out relatively high frequency components, including 15,750 cycle components and above.

Since the relay 44 has already been energized so that the arm 21E is connected to the contact 45E, the amplifier 19 will now be controlled by the direct current from the filter 61, and the frequency of the oscillator 17 will no longer be controlled by the 60 cycle signal from the source 34 but will instead be controlled by the 15,750 cycle signal from generator 13.

In this mode it is desirable not only that the oscillator 17 have the proper frequency but that each television frame begin at the same time. This accomplished by connecting one of the output terminals of multivibrator 42 to a slipping pulse generator 62 which generates pulses $3/15{,}750$ of a second, or three line intervals, long. Thus the slipping pulse genertaor may also be referred to as a three line multivibrator. The output pulse of the slipping pulse generator is applied to a gate circuit 63. An impulse signal recurring 60 times a second is derived from the blocking oscillator 32 and is connected by way of the vertical trigger output terminal 64 to a multivibrator 66 to generate a pulse signal to be compared in the gate 63 with the pulse from the slipping pulse generator 62. If these pulses are not simultaneous, a resultant pulse passes through the gate 63 and into a slipping pulse input terminal 67 from which it is carried to the mixer circuit 29 to modify the operation of the frequency divider 31 until such time as the pulses from the blocking oscillator 32 are exactly in time with the pulses from the slipping pulse generator 62. Thereafter, the operation of the principle synchronizing signal generator will be completely in step with the synchronizing signal produced in the remote generator 13. However, as soon as the signal from the remote generator 13 is removed, either because that generator is turned off or because the link 38 is disconnected, the relay amplifier 43 will no longer be energized and thus the arms 21A–21E will return to the contacts 23A–23E, and operation of the principle synchronizing signal generator will immediately and automatically return to control by the 60 cycle source 34.

If the arms 12A–12E are set to the Free position, again only the E level of the switch 11 will be modified. In that case the arm 12E is directly connected to the junction of two resistors 68 and 69 which are connected to a suitable power supply such as the supply that operates the entire synchronizing signal generator. The ratio of voltage division produced by the resistors 68 and 69 is such as to cause the oscillator 17 to operate at approximately the correct frequency, but some drift may occur unless the voltage source across which the resistors 68 and 69 are connected has a very carefully regulated output voltage.

If the arms 12A and 12E of the switch 11 are moved to the Xtal position, the bottom end of resistor 22 will no longer be connected to ground and therefore the oscillator 17 will cease operation. However, the bottom of resistor 71 connected to the crystal oscillator 14 will be connected to ground through the arm 12B of the switch and the crystal oscillator will then be able to operate. The oscillation produced by this oscillator will be connected to the A level of the switch 11 and through the arm 12A to the flip-flops 26–28 and the remainder of the circuits. The frequency of the crystal oscillator is self-controlled and therefore there is no need for the reactance modulator 18 to operate.

When the synchronizing signal generator is operated in a color television system the color sub-carrier generator 16 may be used to control the generation of synchronizing signals. The sub-carrier generator 16 is connected through an input terminal 72 to an amplifier 73. The output of the amplifier is connected through the contact 23D and the movable arm 21D of the relay to the color terminal of level D of the switch 11. This is connected to a second input circuit of the flip-flop 28 to actuate that flip-flop so as to divide the repetition rate of the incoming signal from the sub-carrier generator 16 of my Patent 3,170,036, supra, by the ratio of 2:1 to a frequency substantially equal to the horizontal repetition rate of the television system. At the same time the signal introduced through the input signal 72 is connected to the contact 23C of the relay and from there by way of the arm 21C to the color terminal at level C of the switch 11. The arm 12C connects this terminal to the mixer 29 and from there the signal is transmitted to the frequency divider 31. Both the crystal oscillator 14 and the other oscillator 17 are inoperative because neither the resistor 71 nor the resistor 72 is connected to ground.

It is a feature of the present invention that no matter to which terminals the arms 12A–12E are connected operation of the relay 44 will automatically place the circuit under the control of the remote synchronizing signal generator 13. As may be seen, operation of the relay 44 will transfer the movable arm 21E from contact 23E to contact 45E thus connecting the reactance modulator 18 to be controlled by the output of the filter 61 no matter what was controlling the reactance modulator 18 prior to that time. At the same time arm 21D will be moved from the contact 23D to the open contact 45D and the arm 21C will be moved from the contact 23C to the contact 45C, thus disconnecting the circuit entirely from the sub-carrier 16 in the event that that is where it was connected when the switching occurred. Connection of the arm 21C to the contact 45C short circuits the Color terminal to the Xtal terminal of level C of the switch 11. Movement of the arm 21B from contact 23B to contact 45B causes the lower terminal of resistor 22 to be returned to ground thus energizing the oscillator 17 even if the arm 12B had been at either the Xtal or Color positions prior to the switching. And finally, movement of the arm 21A from contact 23A to contact 45A connects the output of the oscillator 17 directly to the amplifier 24.

In this condition the arms 12A–12E of the switch 11 may be adjusted to any of their five positions without any effect on the circuit. This has the advantage that the arms 12A–12E may be set to a position which it is expected will be required as soon as the remote synchronizing signal generator 13 is turned off. Once the arms 12A–12E are so set, turning off the remote generator 13 will automatically cause the circuit to transfer to the mode set in advance. For example, if a television station is operating with a black and white signal, it may be running with the generator set at the Xtal position. Then if a remote program such as a baseball game is to be transmitted, it is unnecessary for the station operator to make any change at all; the synchronizing signal generator is automatically adjusted to the remote program as soon as the remote generator 13 is actuated. During the time that the remote program is being transmitted, the operator may shift the position of the arms 12A–12E to the Color terminal in expectation of a color program to be transmitted as soon as the remotely originating program is finished, and automatically upon termination of the remote program, the synchronizing signal generator will be switched to the Color mode.

While this invention has been described in specific terms it will be recognized that the principles involved are not so limited but may be used in other embodiments within the scope of the invention as determined by the following claims.

What is claimed is:

1. A television synchronizing signal generator system comprising: a first oscillator; a reactance modulator to control the frequency thereof; a frequency divider circuit; first means connecting said oscillator to said frequency divider circuit to control the operation thereof; second means to generate a direct voltage signal; a circuit including a switch to connect said second means to said reactance modulator to control the frequency of said first oscillator in accordance with the magnitude of said direct voltage; a second synchronizing signal generator having a second oscillator; third means to derive a direct voltage having a magnitude dependent upon the relative frequencies of said first and second oscillators; a relay connected to said second generator and having contact means to disconnect said circuit and to connect said second oscillator to said third means to control the frequency of said first oscillator in accordance with the frequency of said second oscillator when said second generator is operating; and a color sub-carrier generator, said first means comprising a second switch to connect said sub-carrier generator or said first oscillator to said frequency divider circuit to control the same.

2. The television synchronizing signal generator system of claim 1 in which said second means comprises a fixed source of direct voltage.

3. A television synchronizing signal generator system comprising: a first oscillator; a reactance modulator to control the frequency thereof; a frequency divider circuit; first means connecting said oscillator to said frequency divider circuit to control the operation thereof; second means to generate a direct voltage signal; a circuit including a switch to connect said second means to said reactance modulator to control the frequency of said first oscillator in accordance with the magnitude of said direct voltage; a second synchronizing signal generator having a second oscillator; third means to derive a direct voltage having a magnitude dependent upon the relative frequencies of said first and second oscillators; a relay connected to said second generator and having contact means to disconnect said circuit and to connect said second oscillator to said third means to control the frequency of said first oscillator in accordance with the frequency of said second oscillator when said second generator is operating; a crystal oscillator; means to connect said crystal oscillator or said first oscillator to said frequency divider circuit to control the same; and additional switch means to render either said crystal oscillator or said first oscillator inoperative when the other one is connected to said frequency divider circuit.

References Cited by the Examiner

UNITED STATES PATENTS

| | | | |
|---|---|---|---|
| 2,655,556 | 10/1953 | Abelson | 178—69.5 |
| 2,720,555 | 10/1955 | Krause | 178—69.5 |

DAVID G. REDINBAUGH, *Primary Examiner.*

ROBERT SEGAL, *Examiner.*

J. A. O'BRIEN, *Assistant Examiner.*